B. V. MERRITT.
STREET SWEEPING MACHINE.
APPLICATION FILED MAY 22, 1908. RENEWED MAR. 10, 1913.
1,059,892.
Patented Apr. 22, 1913.
3 SHEETS—SHEET 1.
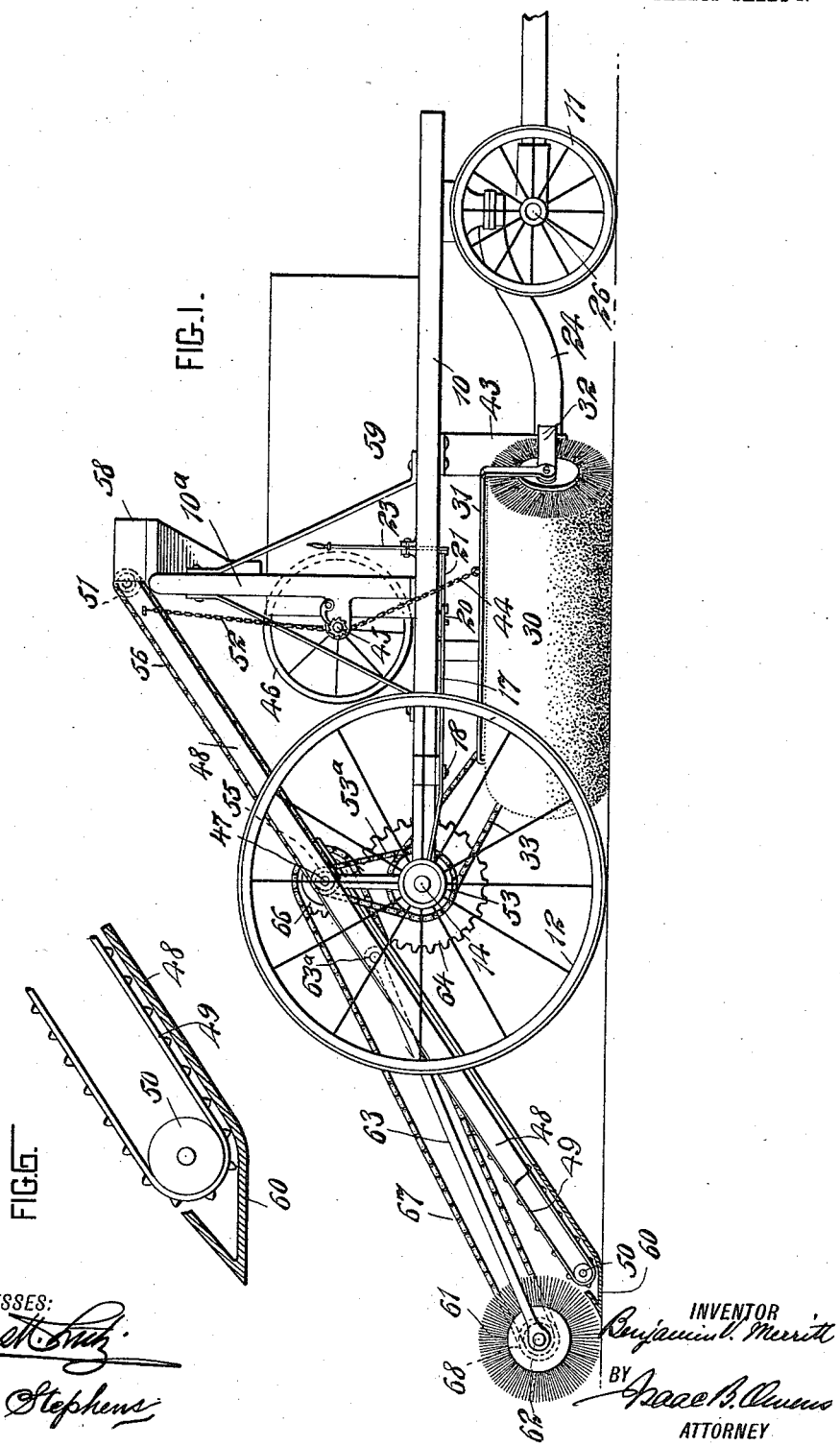

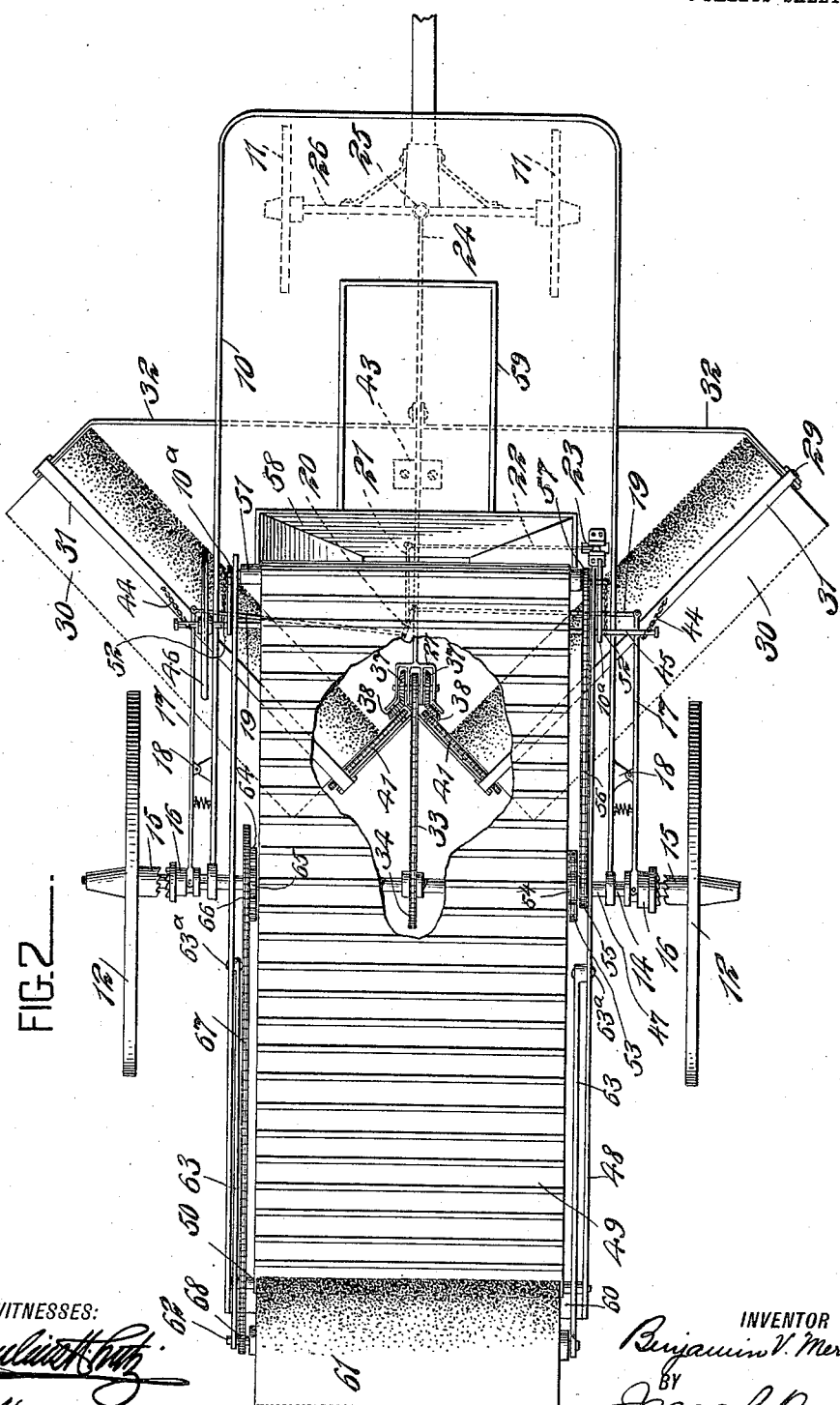

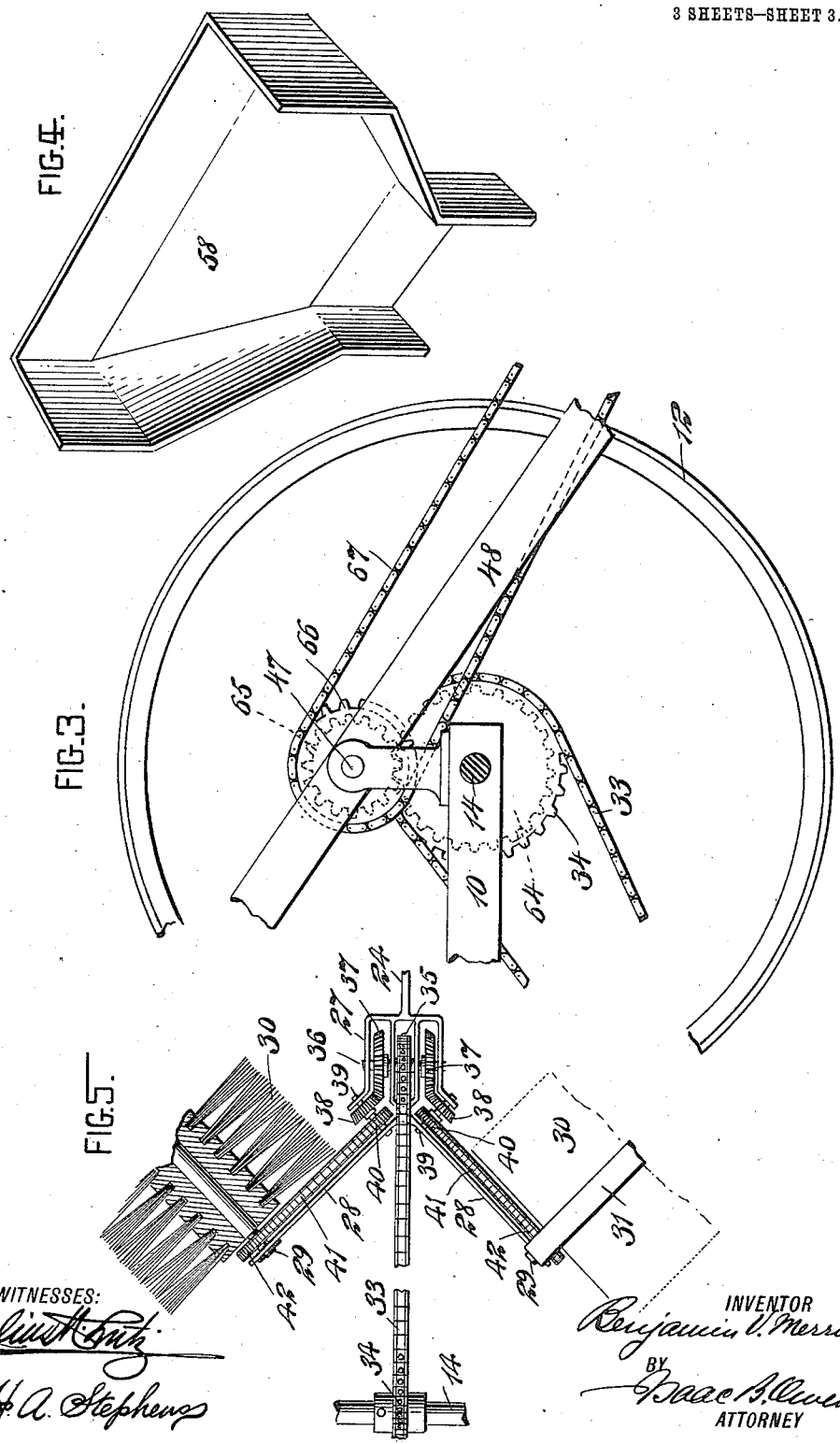

UNITED STATES PATENT OFFICE.

BENJAMIN V. MERRITT, OF NEW YORK, N. Y.

STREET-SWEEPING MACHINE.

1,059,892. Specification of Letters Patent. Patented Apr. 22, 1913.

Application filed May 22, 1908, Serial No. 434,292. Renewed March 10, 1913. Serial No. 753,420.

*To all whom it may concern:*

Be it known that I, BENJAMIN V. MERRITT, of the city of New York, county of New York, and State of New York, have invented certain new and useful Improvements in Street-Sweeping Machines, of which the following is a full, clear, and exact specification, such as will enable others skilled in the art to which it appertains to make and use the same.

My invention relates to those street sweeping machines which embody in general outline a wheeled frame with rotary brooms and devices for elevating the sweepings to a can, bin or other receptacle on the body of the vehicle and it involves various features of construction and relative arrangement which will be fully set forth hereinafter and particularly pointed out in the claims.

Reference is had to the accompanying drawings which illustrate as an example one of the various practical embodiments of the invention, in which drawings, Figure 1 is a side elevation of the apparatus; Fig. 2 is a plan view of the same with parts broken away; Fig. 3 is an enlarged elevation of the rear end of the machine showing particularly the elevator and the manner of mounting and driving the same; Fig. 4 is a detail perspective view of the discharge chute; Fig. 5 is a fragmentary plan view of the gearing for driving the rotary sweeping brooms; and Fig. 6 is a fragmentary detail showing the shoe at the lower end of the elevator.

10 indicates the main frame of the apparatus which is mounted on front wheels 11 and rear wheels 12, the latter wheels being loose on an axle 14 and having clutch members 15 formed on or fastened to their hubs. Coacting with the clutch members 15 are clutch members 16 the teeth of both clutch members being ratchet shaped in form and the clutch members 16 being arranged to slide on the axle and to turn therewith. Said clutch members 16 are grooved to receive the forked ends of spring levers 17 which are fulcrumed on the main frame 10 as indicated at 18 and extend forwardly, their front ends being connected by links 19 with a double crank 20. The shaft of this crank is joined by an arm 21 and link 22 to an operating lever 23 so that the system of linkage may be operated at will to engage and disengage the clutch members 16 with and from the clutch members 15. When the clutch members are disengaged the wheels 12 turn idly on the axle 14, and when engaged the wheels impart rotary motion to the axle. Owing to the shape of the teeth on the clutch members and to the spring character of the levers 17, as the machine is turning a curve the differential motion of the two rear wheels 12 is accounted for, the teeth of one pair of clutch members simply slipping while the other pair of clutch members transmits the force driving the axle 14.

24 indicates a draft bar the front end of which is connected to a king bolt 25 of the front axle 26 (see dotted figure lines in Fig. 2). This draft bar extends rearward and is connected to a yoke 27 which in turn is joined by straps 28 (see Fig. 5) to the axles 29 of the rotary sweeping brooms 30. These brooms as shown in Fig. 2, extend obliquely in opposite directions and their inner ends approach, but do not meet each other so that rotation of the brooms causes the dirt to be swept into a row disposed longitudinally of and centrally under the machine. Connected with the said axles 29 of the brooms 30 are U-shaped frame members 31 and the forward ends of the axles 29 are connected to cross ties 32 which extend horizontally in and meet the draft bar 24. In this manner the two rotary brooms 30 are held in proper position and are drawn with the machine under the body 10 thereof. Said brooms are rotated from the axle 14 by means of a sprocket chain 33 passing over a sprocket 34 on the axle and a sprocket 35 fixed on a short transverse shaft 36 mounted in the yoke 27. To said shaft 36 two miter gears 37 are secured and these in turn mesh with gears 38 secured on short shafts 39 also mounted in the yoke 27 and straps 28. In addition to the gears 38, the shafts 39 carry sprocket wheels 40 over which chains 41 run and through which chains are driven the sprockets 42 secured to the axles 29 of the brooms 30. In this way, according to the adjustment of the clutch members 16, the rotary brooms 30 are driven from the axle, their rotation ceasing with the forward movement of the machine to prevent idle operation. To prevent lateral displacement of the brooms 30, a guide yoke 43 is secured to the under side of the body 10 and depends therefrom as shown in Figs. 1 and 2, the yoke straddling the draft bar 24 to allow free vertical motion thereof but prevent lateral or transverse motion.

To raise the brooms from the pavement when the apparatus is not in operation I fasten to the yoke-like frames 31 (see Figs. 1 and 2) chains or the like 44 which extend upward and are wound around a shaft 45 mounted in a vertical frame part 10ª. This shaft-drum 45 is provided with a hand wheel 46 for operating it and if desired suitable dog devices may be provided for holding the shaft against rotation unless such is desired. When the brooms are thus raised, the draft bar 24 swings vertically on the king bolt 25 and in the guide yoke 43.

Suitably mounted in the frame 10 directly above the axle 14 is a shaft 47 on which is pivoted intermediate its ends a frame 48 of an elevator 49. The elevator may be of any desired construction. It is preferably of an endless canvas apron with suitable lags thereon and runs over rollers 50 and 51 respectively at the ends of the frame 48. Normally the frame 48 is at the inclination shown in Fig. 1 and its rear section slightly preponderates the forward section so that its tendency is to drop at the rear. It may, however, be raised clear of the ground at will by means of a chain or equivalent 52 connected to the forward end of the frame and wound over the above described shaft-drum 45. The apron 49 is driven by a sprocket 53 fast on the axle 14 over which a chain 53ª runs to a sprocket 54 loose on the shaft 47 and having connected therewith a sprocket wheel 55 over which runs a chain 56 to a sprocket wheel 57 on the front roller 51. At its upper front end the conveyer discharges into a chute 58 which may be of any desired form and this in turn empties the material into a hopper, can or other receptacle 59 mounted on the body 10 of the apparatus.

At its rear or lower end the frame 48 is provided with a shoe 60 which is adapted to run on or immediately above the surface of the pavement and to protect the lower roller 50 from damage by stones or other obstructions which may lie on the pavement. Immediately rearward of this shoe a transverse rotary broom 61 is arranged which serves to sweep up the dirt collected by the brooms 30 and raise the same upon the elevator apron so that it may be carried up and discharged through the chute into the hopper 59. This broom 61 has its axial shaft 62 connected to draft bars 63 at each end which pass upward and forward along the sides of the frame 48 and are articulated thereto as indicated at 63ª in Figs. 1 and 2. In this manner the broom 61 is drawn behind the elevator. The broom 61 is driven from the shaft 47 through a gear 64 which is fastened to the axle 14 and meshed with a gear 65 loose on said shaft 47. This gear 65 also carries a sprocket 66 over which a chain 67 runs to a sprocket 68 secured to the axle 62 of the broom 61.

In the organized operation of the apparatus the brooms are lowered into engagement with the pavement and the elevator is allowed to drop to its operative position. The clutch sections 16 are thrown into action with the sections 15 by the operation of the hand lever 23 and upon forward motion of the machine the rotation of the brooms 30 gathers in the dirt within the path of the brooms and sweeps the same into a row central of the machine and longitudinal thereof. As the machine advances the row of dirt thus swept in by the brooms 30 is engaged by the broom 61 and this throws the dirt up over the shoe 60 onto the lags of the apron 49 and by the continuous motion of said apron the dirt is lifted to and dropped over the forward end of the apron through the chute 58 and into the bin 59.

The machine may be made of any convenient width and it will be seen that it not only thoroughly sweeps the surface over which it moves, but it gathers the dirt thus swept, lifts it into the conveyer and by this conveyer raises the dirt to a hopper or other receptacle on the body of the machine. This hopper may be removed when full and the contents discharged at a suitable dumping point. Further, a hood or covering may be placed over the bin to prevent dust from flying from the machine. When it is desired to stop the operation of the machine the clutch sections 16 may be disengaged and the hand wheel 46 operated to wind the chains 44 and 52 on the shaft 45, thus simultaneously raising the brooms 30 and clearing the rear end of the conveyer and the rear broom from the ground. This leaves nothing in contact with the ground but the wheels of the machine and it may then be drawn at will from one point to another.

Having thus described my invention, what I claim as new and desire to secure by Letters Patent of the United States is:

1. A street sweeping machine having a frame, axles and wheels therefor, a pair of brooms under the frame adapted to throw the dirt inward in a row disposed longitudinally of the path of movement of the machine, a draft bar connected to the brooms and extending forward to and joined with the front axle of the frame, a vertically disposed guide for the draft bar and means for raising and lowering the draft bar and brooms at will.

2. A street sweeping machine having a frame, a pair of brooms under the same adapted to throw the dirt inward in a row disposed longitudinally of the path of movement of the machine, a draft bar connected to the brooms and extending forward to and joined with the front axle of the frame, a vertically disposed guide for the draft bar, means for raising and lowering the draft bar and brooms at will, an elevator mounted on the rear of the frame and inclining upward and forward from its lower end, a broom rearward of the elevator adapted to throw the dirt thereon and means on the frame at the front end of the elevator for receiving the dirt raised thereby.

3. A street sweeping machine having a wheeled frame, two rotary brooms mounted under the frame and disposed obliquely to each other, a draft bar connecting the brooms with the forward portion of the wheeled frame, a yoke at the rear end of the draft bar, straps joining the yoke to the axles of the rotary brooms, a rotary shaft mounted in the yoke, gearing for driving the shaft from one of the axles of the wheeled frame, two additional shafts mounted in the yoke, gearing for driving said additional shafts from the first named shaft and chain and sprocket connections between said additional shafts and the axles of the brooms.

4. A street sweeping machine having a frame, two axles and wheels supporting the same, a shaft mounted on the frame above the rear axle, an elevator frame pivoted on the said shaft, a gear element loose on the shaft, means to drive the gear element from the rear axle, means to drive the elevator from the said gear element, a broom for throwing the dirt into the elevator, a second gear element loose on the shaft, means to drive the second gear element from the rear axle, means to drive the broom from the second gear element and means to secure, at the will of the operator, the wheels mounted on the rear axle thereto to drive it.

5. A street sweeping machine having a wheeled frame with front and rear axles, a pair of oblique rotary brooms mounted under the frame between the axles, a draft bar hung at the forward axle and extending rearward to and connected with the brooms to draw the same and gearing extending from the rear axle to and connected with the rear end of the draft bar to drive the brooms.

In testimony whereof I have signed my name to this specification in the presence of two subscribing witnesses.

BENJAMIN V. MERRITT.

Witnesses:
ETHEL I. McLAUGHLIN,
ISAAC B. OWENS.

Copies of this patent may be obtained for five cents each, by addressing the "Commissioner of Patents, Washington, D. C."